July 7, 1964 C. L. TRUESDALE Re. 25,613

DRAPERY HEADING SEAM

Original Filed Nov. 28, 1960 2 Sheets-Sheet 1

Cavour Langdon Truesdale
INVENTOR.

BY Clarence A. O'Brien and Harvey B. Jacobson
Attorneys

DRAPERY HEADING SEAM

Original Filed Nov. 28, 1960 2 Sheets-Sheet 2

Cavour Langdon Truesdale
INVENTOR.

BY Clarence A. O'Brien and Harvey B. Jacobson
Attorneys

United States Patent Office

Re. 25,613
Reissued July 7, 1964

25,613
DRAPERY HEADING SEAM

Cavour Langdon Truesdale, Richmond, Va., assignor to Plastic Products, Incorporated, Richmond, Va., a corporation of Virginia Original No. 3,084,738, dated Apr. 9, 1963, Ser. No. 72,073, Nov. 28, 1960. Application for reissue June 21, 1963, Ser. No. 290,885
8 Claims. (Cl. 160—330)

Matter enclosed in heavy brackets [ ] appears in the original patent but forms no part of this reissue specification; matter printed in italics indicates the additions made by reissue.

The present invention generally relates to a novel and improved structure in a plastic drapery and more particularly to a novel heading at the upper edge of the drapery for receiving the usual supporting elements.

Heading structures for plastic drapes have been developed to a certain extent as disclosed in prior Patent No. 2,884,053, issued April 28, 1959. As set forth in that patent, plastic drapes are used for many purposes and the heading structure at the upper edge of the draperies is a most important part of the present invention. The drapery structure of the present invention has for its primary object the provision of a novel heading structure providing downwardly opening pockets for receiving supporting drapery hooks or the like formed by spaced parallel seams formed by heat sealing.

Another very important object of the present invention is to provide a drapery structure in accordance with the preceding object in which the heading structure is formed from a plurality of superimposed members with at least one of said members being constructed of a relatively stiff reinforcing material for retaining the heading structure of the drapes in a neat condition.

Still another feature of the present invention is the construction of the heading of the drapery of a plurality of layers of plastic material sandwiching a layer of reinforcing material such as buckram or crinoline impregnated with a vinyl plastic whereby the elements of the heading structure are secured to each other and to the main drape by heat sealing the elements together, the elements being secured to the main drapery by a plurality of spaced heat sealed areas for bonding the elements of the heading to the main drape and at the same time eliminating weak points in the drapery.

Yet another important feature of the present invention is the provision of a plastic drapery having a reinforced heading having downwardly opening pockets formed therein which is simple in construction, easy to manufacture, easy to provide with supporting hooks, neat in appearance when suspended and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
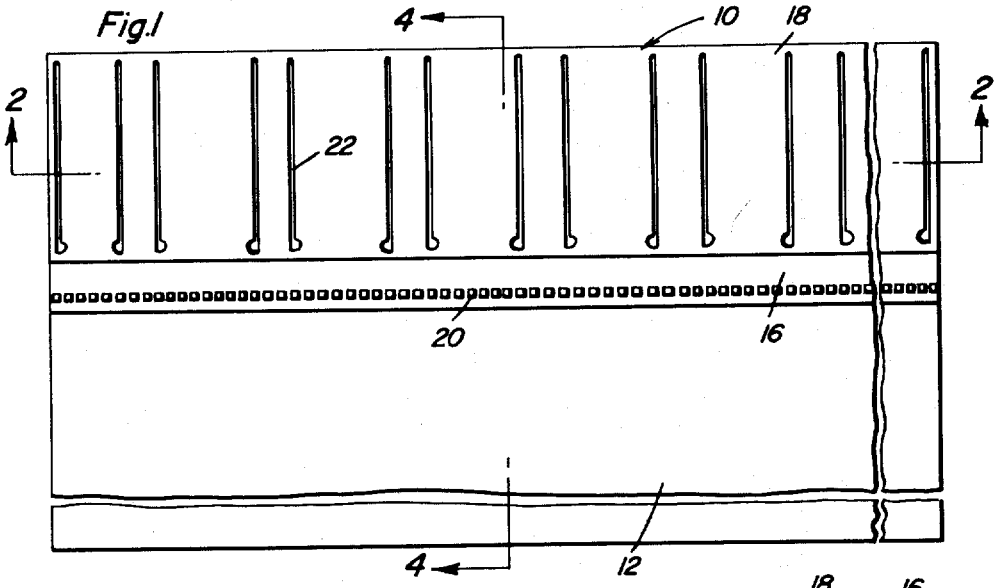
FIGURE 1 is a plan view of a drapery illustrating the interior surface of the drapery of the present invention.
Figure 2:
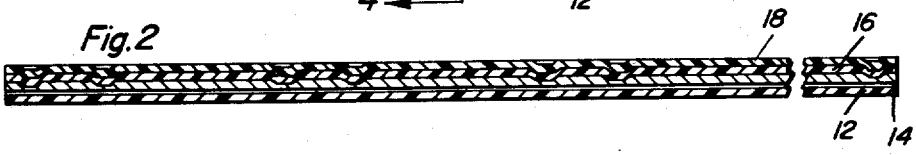
FIGURE 2 is a detailed sectional view taken substantially upon a plane passing along section line 2—2 of FIGURE 1 illustrating the construction thereof.
Figure 3:
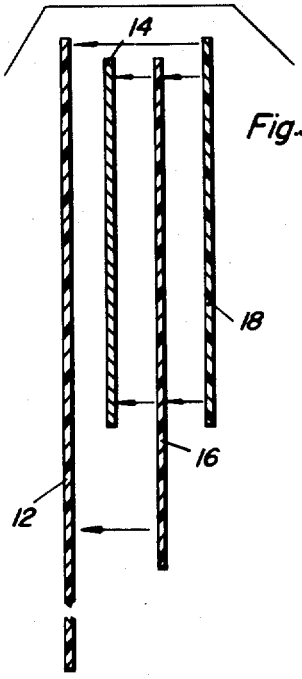
FIGURE 3 is an exploded view illustrating the components of the present invention and the manner in which they are assembled and heat sealed to each other.
Figure 4:
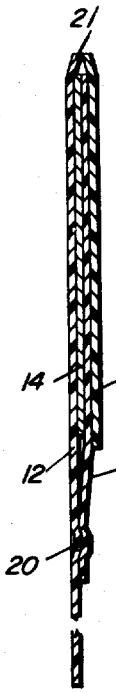
FIGURE 4 is a detailed sectional view taken substantially upon a plane passing along section line 4—4 of FIGURE 1 illustrating the arrangement of the components when assembled.

Referring now specifically to the drawings, the numeral 10 generally designates the drapery construction of the present invention which includes an enlarged main drape panel 12 formed of plastic material such as vinyl, polyethylene and the like. The main drape panel 12 is of any desired size and may be provided with any suitable coloring, design or the like on the surface. The panel may be either opaque, translucent or the like and is supported by any suitable support rod disposed over the area which is to be covered by the drape.

The heading at the upper end of the main drape panel includes a plurality of structural components including the upper edge portion of the main panel 12. Disposed against the inner surface of the main panel 12 is a reinforcing member 14 of buckram or crinoline impregnated with a thermoplastic material such as vinyl or the like. As illustrated, the reinforcing member 14 is disposed against the inner surface of the main panel 12 and has the upper edge thereof slightly spaced below the upper edge of the main panel 12. Disposed against the inner surface of the plastic impregnated buckram or crinoline reinforcing member 14 is a vinyl plastic strip 16 having the upper edge thereof slightly disposed below the reinforcing material edge and having the lower edge thereof extending substantially below the lower edge of the buckram reinforcing member 14. Disposed against the inner surface of the vinyl strip 16 is another and slightly thicker vinyl strip 18. The vinyl strip 18 is thicker than the vinyl strip 16 but is not as stiff as the reinforcing plastic impregnated buckram or crinoline member 14.

The lower edge of the thin vinyl strip 16 is secured to the main plastic drape panel 12 by a plurality of slightly spaced heat sealed areas 20 which form what may be considered a Greek key with the drape panel 12. The upper edge of the innermost and thicker vinyl panel 18 is heat sealed to the top edge of the main drapery panel 12 as indicated at numeral 21.

All of the elements 14–18 are secured together by a plurality of longitudinally elongated heat sealed seams 22 which extend from the lower edge of the plastic strip 18 and extend throughout the vertical height thereof thus defining a plurality of longitudinally spaced pockets for receiving supporting hooks. The longitudinal heat seams 22 are formed by any suitable mechanism and heat and pressure applied will fuse or join all of the plastic elements 14–18 which leaves main panel 12 free except at areas 20 and 21.

Figure 5:
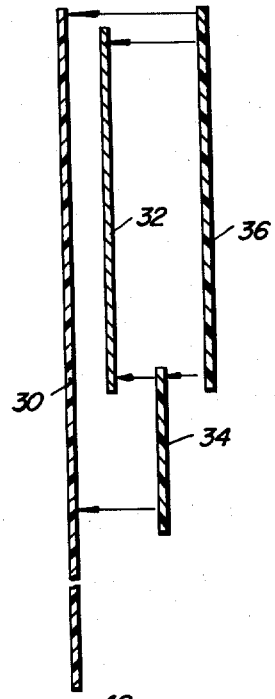
FIGURE 5 is an exploded view similar to FIGURE 3 of a modified form of the present invention.
Figure 6:
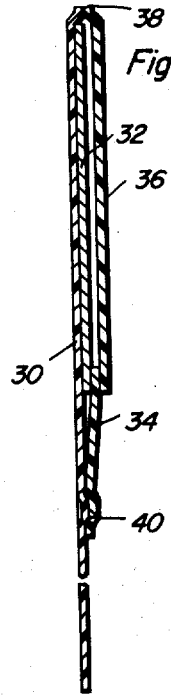
FIGURE 6 is a sectional view of the construction of FIGURE 5 when assembled.

The form of the invention illustrated in FIGURES 5 and 6 is similar to that illustrated in FIGURE 1 and includes a main drapery panel 30, a plastic impregnated buckram or crinoline reinforcing member 32, a relatively narrow vinyl plastic strip 34 and an innermost vinyl plastic strip 36. The upper edge of the buckram or reinforcing member 32 is disposed just below the seam 38 at the upper edge of the main panel 30 and the lower edge of the plastic strip 34 is secured between the lower edges of the buckram reinforcing member 32 and vinyl plastic strip 36. The elements are heat sealed to each other in the manner illustrated in FIGURE 6 in which the strip 34 is narrow but extends between the main panel 30 and strip 36 and is heat sealed to the panel 30 by a plurality of longitudinally spaced heat sealed areas 40 and the upper edge of the strip 34 is disposed intermediate the lower edge of the buckram reinforcing member 32 and the vinyl strip 36 and is heat sealed thereto at longitudinally spaced vertical lines along the heading to form pockets somewhat in the nature of the pockets formed in FIGURE 1. The top edge of the vinyl strip 36 is heat sealed to the top edge of the main drape panel 30 along heat seal line 38 which is above the top edge of the buckram which allows for passage of air over the top edge of the reinforcing member 32 in the same manner as in the device of FIGURE 1.

Figure 7:
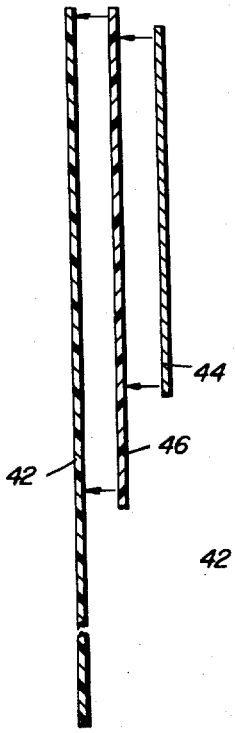
FIGURE 7 is an exploded view of another form of the invention employing only three components.
Figure 8:
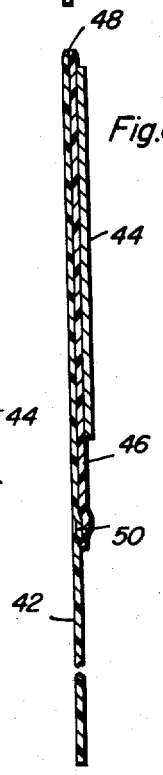
FIGURE 8 is a sectional view of the construction of FIGURE 7 illustrating the orientation of the components when assembled.
Figure 9:
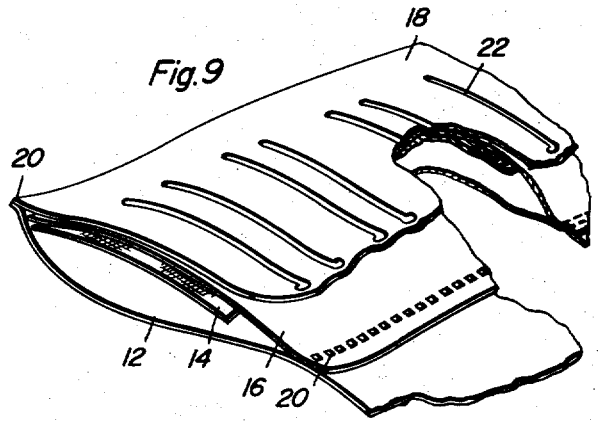
FIGURE 9 is a fragmentary perspective view of the construction of FIGURE 1 with portions thereof broken away illustrating in detail the relationship of the structural components.

FIGURES 7 and 8 illustrate a simplified form of the invention in which the main drape panel is designated by reference numeral 42, the buckram reinforcing member or strip is designated by numeral 44 and a vinyl strip is designated by numeral 46. In this construction, the vinyl strip 46 is disposed immediately adjacent and is heat sealed to the main panel 42 along a top edge 48 and at longitudinally spaced points 50. The buckram strip 44 which is shorter than the vinyl strip 46 is secured to the vinyl strip 46 at longitudinally spaced vertical lines for providing a plurality of vertical pockets which are open at the top and at the bottom for receiving the supporting fasteners and also for permitting passage of air from the top of the pockets.

In each form of the invention, the buckram forms a reinforcement or stiffening material for the drape and the particular construction of the assembly, in each instance, enables air to be vented from the pocket. Also, this construction completely eliminates conventional stitching thus eliminating a weakening structure. Further, the spaced points of sealing of the components together will eliminate a continuous weakened area which may be formed by a heat seal and which sometimes begins to rip or tear at this point.

The foregoing is considered as illustrtaive only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

[1. A drapery comprising a main panel of plastic material, a reinforcing member, and a strip of vinyl plastic, said reinforcing member and strip being heat sealed together along vertical lines, said vertical lines of sealing being spaced from each other, said reinforcing member being of relatively stiff material impregnated with plastic material whereby the strip may be heat sealed to the reinforcing member, said strip being heat sealed to said main panel for retaining the components assembled.]

[2. The structure as defined in claim 1 wherein said reinforcing member is in the form of a strip of buckram impregnated with a thermoplastic material.]

[3. The structure as defined in claim 1 wherein the strip of vinyl is disposed in overlying relation to the reinforcing member, and a narrow strip of vinyl plastic disposed between the lower edge of the vinyl strip and the reinforcing member and sealed thereto, the lower edge of the narrow strip being attached to the main panel at a plurality of longitudinally spaced points below the lower edge of the reinforcing member.]

[4. The structure as defined in claim 1 wherein said reinforcing member is disposed against the inner surface of the vinyl strip, said vinyl strip disposed against the inner surface of the main panel with all three components being attached together by heat sealing along a plurality of spaced vertical lines thereby defining a plurality of pockets.]

[5. The structure as defined in claim 1 wherein said reinforcing member is disposed against the main panel, said vinyl strip being disposed against the reinforcing member and extending therebelow for connection with the main panel, and a second vinyl strip disposed against the first vinyl strip, and connected thereto with the lower edge of the second vinyl strip being coincidental with the lower edge of the reinforcing member thus defining pockets for supporting hooks when the plurality of spaced vertical heat sealed lines are formed.]

6. A plastic drape comprising an enlarged sheet of plastic material, a [strip of buckram] *reinforcing member of relatively stiff material containing a thermoplastic substance* disposed along the upper edge of the inner surface of said sheet, a first strip of [vinyl] plastic disposed in overlying relation to the [strip of buckram] *reinforcing member* with the [edges] *lower edge* thereof extending [above and] below the [edges] *lower edge* of the [buckram strip] *reinforcing member* and a second plastic strip overlying *at least a portion of the width of* said first plastic strip [with the lower edge of the second plastic strip being connected to the first plastic strip generally coincidental with the lower edge of the buckram], the upper edge of the second plastic strip being connected with the upper edge of the plastic sheet, the upper edge of the first plastic strip being spaced below the upper edge of the plastic sheet, said [buckram] *reinforcing member* and plastic strips being secured together by longitudinally spaced vertical heat sealed seams for providing bottom opening pockets [between the first and] *beneath the* second plastic [strips] *strip* for receiving [fastener] *supporting* hooks, said [strip of buckram] *reinforcing member* being stiffer than the plastic strips and reinforcing the pockets, [the upper edges of the strips and buckram enabling escapement of air from the pockets] *there being a passage for escapement of air from beneath said reinforcing member between said first and second strips and through said pockets.*

7. The structure as defined in claim 6 wherein the first mentioned plastic strip is attached to the plastic sheet at a plurality of closely spaced longitudinal areas to eliminate continuous weakened areas in the plastic sheet.

8. A plastic drape construction comprising an enlarged main panel of plastic material, a strip of stiff cloth [impregnated with] *containing* thermoplastic material forming a reinforcing member and disposed against the inner surface of the upper edge portion of said main panel, a first plastic strip disposed against the inner surface of the reinforcing member and having the lower edge thereof extending below the lower edge of the reinforcing member, a second plastic strip disposed against the inner surface of the first plastic strip and having the upper edge aligned with the upper edge of the main panel and the lower edge thereof disposed above the lower edge of the first plastic strip and in alignment with the lower edge of the reinforcing member, said reinforcing member and the first plastic strip having the upper edges thereof aligned and spaced below the upper edges of the main panel and the second plastic strip, the upper edges of the main panel and second plastic strip being continuously sealed at the upper edge thereof, the lower edge of the first plastic strip being heat sealed to the main panel at a plurality of closely and longitudinally spaced areas thereby eliminating a continuous weakened area on the main panel, said reinforcing member, first plastic strip and second plastic strip being secured together by a plurality of longitudinally spaced vertical heat sealed areas thereby forming downwardly opening vertical pockets between the first and second plastic strips with the reinforcing member serving to reinforce the entire length of the pocket for maintaining it in a neat condition and also maintaining the plastic relatively stiff so that pleats formed therein will maintain their shape.

9. The structure as defined in claim 8 wherein said heat sealed areas are orientated in spaced pairs with the areas in each pair being spaced apart sufficiently to receive a drapery supporting hook.

10. The structure as defined in claim 9 wherein said second plastic strip is thicker than the first plastic strip, said main panel being free of the reinforcing member whereby air may be vented over the top and bottom edges of the reinforcing member, said reinforcing member being connected solely to the first and second plastic strips at the spaced vertical heat sealed areas.

*11. A drapery comprising a main panel of plastic material, a reinforcing member containing a thermoplastic material, first and second strips of plastics, said reinforcing member and said strips being joined by a series of substantially vertical lines of heat sealing spaced at intervals along the lengths of said reinforcing member and said strips, said lines of heat sealing defining a series of vertically disposed pockets between said first and second strips, said lines of heat sealing combining said reinforcing member and said strips in a series of tear-resisting joints, thereby resisting separation of said strips from said reinforcing member, said reinforcing member being disposed against said main panel, said first strip being disposed in overlying relation to said reinforcing member and extending therebelow and being attached to said main panel at a plurality of longitudinally spaced points below the lower edge of said reinforcing member, said second strip being disposed in overlying relation to a portion of the width of said first strip, the top of said second strip being sealed along the top of said main panel.*

*12. A drapery comprising a main panel of plastic material, a reinforcing member containing a thermoplastic material, a first strip of plastic, and a second strip of plastic narrower than said first strip, said reinforcing member and said first and second strips being joined by a series of substantially vertical lines of heat sealing spaced at intervals along the lengths of said reinforcing member and said strips, said lines of heat sealing defining a series of vertically disposed pockets between said reinforcing member and said first strip, said lines of heat sealing combining said reinforcing member and said strips in a series of tear-resisting joints, thereby resisting separation of said strips from said reinforcing member, said reinforcing member being disposed against said main panel, said first strip being disposed in overlying relation to said reinforcing member, said second strip being disposed between the lower edge of said first strip and said reinforcing member and being heat-sealed therebetween, the lower edge of said second strip being attached to said main panel at a plurality of longitudinally spaced points below the lower edge of said reinforcing member.*

*13. A drapery comprising a main panel of plastic material, a strip of plastic, and a relatively stiff reinforcing member containing a thermoplastic material, said strip being disposed against said main panel and being heat-sealed thereto, said reinforcing member being disposed in overlying relation to said strip, said reinforcing member and said strip being joined by a series of substantially vertical lines of heat sealing spaced at intervals along the lengths of said reinforcing member and said strip, said lines of heat sealing defining a series of vertically disposed pockets between said reinforcing member and said strip, said lines of heat sealing combining said reinforcing member and said strip in a series of tear-resisting joints, thereby resisting separation of said strip from said reinforcing member.*

References Cited in the file of this patent or the original patent

UNITED STATES PATENTS

| | | |
|---|---|---|
| 2,126,834 | Steinberger | Aug. 16, 1938 |
| 2,647,574 | Levine | Aug. 9, 1953 |
| 2,658,551 | Bender | Nov. 10, 1953 |
| 2,768,922 | Klein | Oct. 30, 1956 |
| 2,884,053 | Truesdale | Apr. 28, 1959 |